J. Tucker,
Water Wheel,
No. 56,835. Patented July 31, 1866.
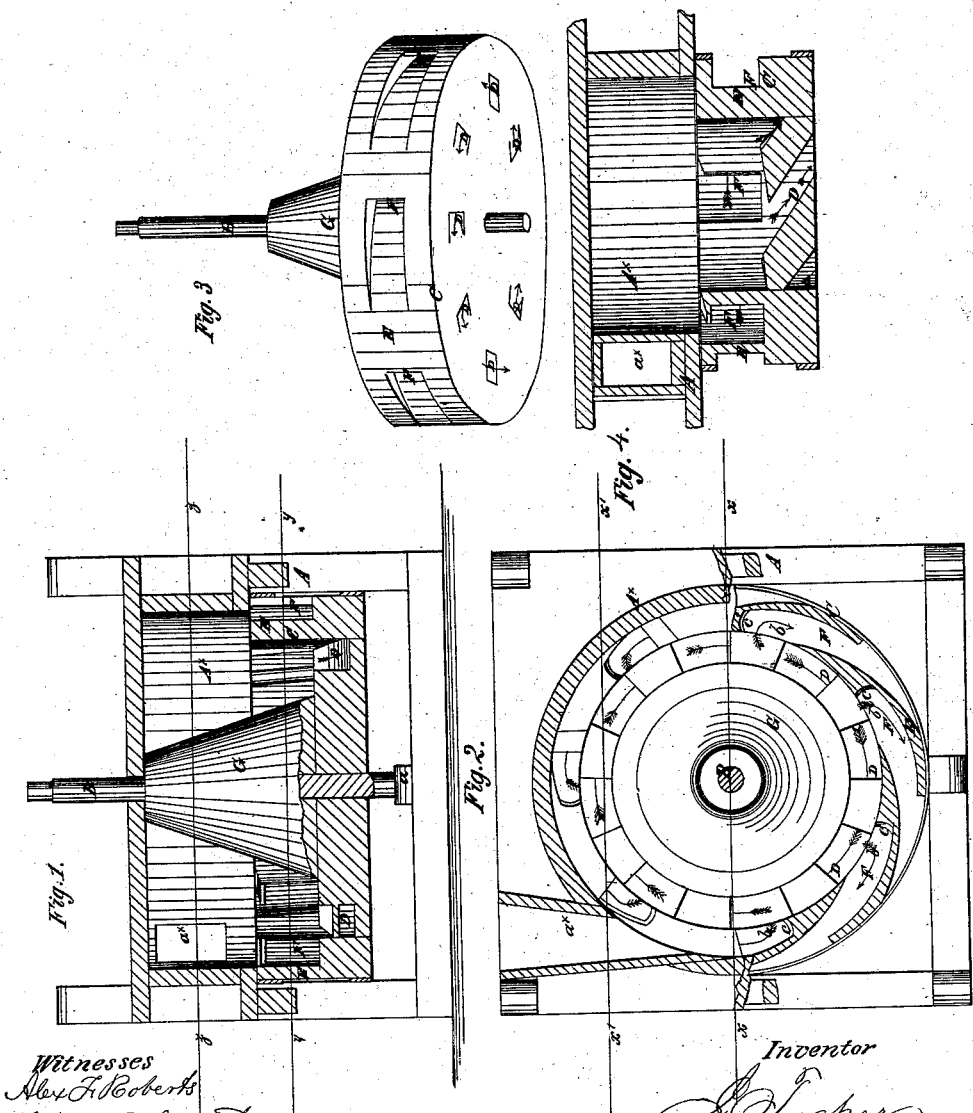

UNITED STATES PATENT OFFICE.

JESSE TUCKER, OF ADRIAN, MICHIGAN.

IMPROVEMENT IN WATER-WHEELS.

Specification forming part of Letters Patent No. 56,835, dated July 31, 1866.

*To all whom it may concern:*

Be it known that I, JESSE TUCKER, of Adrian, in the county of Lenawee and State of Michigan, have invented a new and Improved Water-Wheel; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $x\,x$, Fig. 2; Fig. 2, a horizontal section of the same, taken one half in the line $y\,y$ and the outer half in the line $z\,z$, Fig. 1; Fig. 3, a detached perspective view of the wheel; Fig. 4, a vertical section of the same, taken in the line $x'\,x'$, Fig. 2.

Similar letters of reference indicate like parts.

This invention relates to a new and improved water-wheel of that class which are placed on a vertical shaft, and are commonly termed "horizontal" wheels.

The invention consists in a novel arrangement of issues, as hereinafter fully shown and described, whereby it is believed that a greater percentage of the direct and reactive power of the water is obtained than with the ordinary horizontal wheels.

A represents a framing, which may be constructed in any proper manner to support the working parts, and B is the wheel-shaft, the lower end of which is stepped in a cross-bar, $a$, at the bottom of the framing.

C is the wheel, the bottom of which is formed with a series of inclined issues, D, (shown more particularly in Fig. 4;) and E is an upright rim or flange, which extends all around the bottom, forming the side of the wheel. This upright rim or flange is provided with issues F, of curved form and gradually diminishing in width from their inner to their outer ends, as shown clearly in Fig. 2. The inner ends or orifices of these issues are in recesses $b$ in the inner surface of the rim E, and the front sides, $c$, of these recesses are made slightly concave in a transverse direction, as shown in Fig. 2.

On the shaft B there is placed a conical hub, G, the base of which is in contact with the bottom of the wheel, and serves as a guide for the water filling the central portion of the wheel, (see Figs. 1 and 2,) and extending up centrally through a cylindrical case, A*, over the wheel, and through which case the water is admitted upon the wheel, one or more induction-passages, $a^{*}$, being used. (See Fig. 1.)

From the above description it will be seen that the water acts upon the wheel in three different ways: first, by impact against the front concave sides, $c$, of the recesses $b$, and then by reaction in passing through the issues F. The water which passes through the issues D acts by gravity and percussion combined. The direction of the water in passing through the wheel is indicated by the red arrows.

This wheel has been practically tested, and has been found to answer an admirable purpose, giving out a large percentage of the power of the water.

Having thus described my invention, I claim as new and desire to secure by Letters Patent—

A horizontal water-wheel provided with a bottom having a series of inclined issues, D, and also provided with an upright rim or flange, E, having a series of curved taper issues, F, in connection with the conical hub G on shaft B and the cylinder A* over the wheel, all arranged substantially as shown and described.

JESSE TUCKER.

Witnesses:
A. B. PALMER,
R. B. ROBBINS.